United States Patent [19]
Fields et al.

[11] Patent Number: 6,028,675
[45] Date of Patent: Feb. 22, 2000

[54] TRANSMISSION ERROR DETECTION SYSTEM AND METHOD FOR IMAGING SYSTEMS INCLUDING PRINTERS WITH INTELLIGENT OPTIONS

[75] Inventors: Thomas Austin Fields, Winchester; David Brian Langer; Steven Wayne Parish, both of Lexington, all of Ky.

[73] Assignee: Lexmark International, Inc., Lexington, Ky.

[21] Appl. No.: 08/969,240

[22] Filed: Nov. 13, 1997

Related U.S. Application Data

[62] Division of application No. 08/853,767, May 9, 1997.

[51] Int. Cl.[7] .................................................. G03G 15/00
[52] U.S. Cl. ....................... 358/1.14; 358/1.12; 358/1.13; 714/44; 714/48; 399/18
[58] Field of Search ....................... 395/112–114; 714/44, 714/48; 399/18; 358/1.12–1.14

[56] References Cited

U.S. PATENT DOCUMENTS

| | | | |
|---|---|---|---|
| 4,282,583 | 8/1981 | Khan et al. | 364/900 |
| 4,426,166 | 1/1984 | Bowling | 400/62 |
| 4,556,959 | 12/1985 | Allen et al. | 364/900 |
| 4,710,871 | 12/1987 | Belknap et al. | 364/200 |
| 4,825,404 | 4/1989 | Theus | 364/900 |
| 4,965,771 | 10/1990 | Morikawa et al. | 364/900 |
| 5,014,193 | 5/1991 | Garner et al. | 364/200 |
| 5,056,001 | 10/1991 | Sexton | 364/200 |
| 5,228,118 | 7/1993 | Sasaki | 395/112 |
| 5,428,748 | 6/1995 | Davidson et al. | 395/275 |
| 5,434,982 | 7/1995 | Calzi | 395/325 |
| 5,437,019 | 7/1995 | Brockmann | 395/400 |
| 5,467,434 | 11/1995 | Hower, Jr. et al. | 395/114 |
| 5,488,454 | 1/1996 | Fukada et al. | 355/202 |
| 5,507,003 | 4/1996 | Pipkins | 395/851 |
| 5,524,269 | 6/1996 | Hamilton et al. | 395/829 |
| 5,530,897 | 6/1996 | Meritt | 395/829 |
| 5,535,415 | 7/1996 | Kondou et al. | 395/828 |
| 5,729,624 | 3/1998 | Tanioka et al. | 382/162 |
| 5,761,600 | 8/1997 | Murata | 399/403 |

*Primary Examiner*—Mark R. Powell
*Assistant Examiner*—Lance W. Sealey
*Attorney, Agent, or Firm*—Ronald K. Aust; John Victor Pezdek

[57] ABSTRACT

A print system includes a printer having a printer controller. One or more optional support devices are associated with the printer, wherein each optional support device includes a device controller. The system further includes a bi-directional serial communications path, including one or more trunklines, which provides serial electrical interconnection between the printer controller and each device controller of each optional support device of the system. The printer controller automatically assigns a unique device address to each optional support device. Transmission error detection system and method are provided at the printer controller and/or each optional support device.

52 Claims, 9 Drawing Sheets

TRANSMISSION ERROR DETECTION SYSTEM AND METHOD FOR IMAGING SYSTEMS INCLUDING PRINTERS WITH INTELLIGENT OPTIONS

This is a division of U.S. patent application Ser. No. 08/853,767 filed May 9, 1997.

BACKGROUND OF THE INVENTION

1. Field of the Invention

The present invention relates to imaging systems with printers and optional support devices therefor, and more particularly relates to printers, such as laser printers, having options (e.g. paper handling devices) which contain electronic intelligence for carrying out local option functions commanded by the printer.

2. Description of Related Art

Imaging, or printing, systems typically include a base printer, which places marks (i.e., prints) on a print receiving media (e.g., paper) and media handling options, or devices, that perform various functions such as, for example, providing for multiple paper input sources, multiple paper output destinations, duplexing (i.e., 2-sided printing on the media), stacking and collating. Such printer systems include a base printer having a printer controller, or engine controller, including a microprocessor and associated electronic units. Control of the printer and paper handling facets of such a simple print system are handled by the printer controller. As printer systems add a small number of optional devices, such as additional input sources, the control of the additional devices is provided by the printer controller. For example, the printer option might have electronics to control portions of its own mechanism in which case the printer controller controls the mechanism of the optional device directly through discrete electrical signals or via a unidirectional serial transmission, i.e., communications from the engine controller to the device only. The printer controller controls the optional device directly with dedicated electrical signal lines used to turn a device motor on, turn the motor off, activate a device clutch, etc.

As printer systems become more complex, it is impractical for the printer's engine controller to directly control the entire printer system's electro-mechanical mechanism. Thus, printer systems have migrated to an architecture in which the printer acts as a "master" of "smart" or intelligent optional devices. Each intelligent optional device typically contains a microprocessor and associated electronics and microcode, to control its own electro-mechanical mechanism. The printer controller, in turn, controls or manages the function of the optional devices as black boxes via a communications interface.

The presence of options with intelligence, of course, raises other kinds of problems. For example, optional devices with intelligence are usually controlled by a low function microcontroller with a built in UART to perform the serial communications task with the printer. These low level microcontrollers usually only operate at a low communications or baud rate. When the printer has to communicate with several optional devices and issue several commands to each device, a communications bus bandwidth problem is presented, i.e., communications to the devices cannot be accomplished in sufficient time to support the printer's and/or device's operation.

Another problem with such a serial interface is that the printer often must send the same command (or instruction) to every optional device in the printer system. A good example of this is when the printer needs to instruct all the devices to "reset" themselves to their default conditions. The simplistic approach for accomplishing this is for the printer to address every device, one at a time, sending the devices the same command until every device in the printer system has received the printer's instruction.

Another distinct problem in a system utilizing a serial communications bus to interconnect master and optional devices relates to the detection and reporting of transmission errors.

With respect to errors in transmission detected by the printer controller (master) in a master/optional device relationship, typical solutions specify that the master resend a command if the master has determined that a transmission error occurred on the initial transmission. However, there are limitations in such solutions.

Such solutions lack effective or efficient means for terminating a multi-byte command that is in progress when the master detects the transmission error, so that both the master and optional devices reset their command processing successfully. Solutions for doing so are often complicated because the syntax (number of command bytes, number of response bytes) for the command may depend on the command op code (or its equivalent), and/or length fields that define the length of the command or response at the time the command/response is sent. Errors that occur in the command op code, command length field, or response length field are particularly difficult for prior art solutions to deal with.

Also, such solutions do not provide a simple means for allowing the master to report the transmission error immediately to an optional device in the middle of a command/response that is in progress. Generally, the master will attempt to finish a command/response that is in progress even though the transmission error may have altered the command syntax that is being assumed by the optional device. Since the master attempts to complete the command, the device will receive a complete command that may contain erroneous data, or may actually be a different command than was intended.

With respect to errors detected by an optional device, one of two approaches is typically used to allow an optional device to report a detected transmission error to the master controller.

The first solution is to reserve a special response byte value, such as 255, solely for reporting a transmission error. A device is then not permitted to ever use the value 255 as a response byte unless it is attempting to report a transmission error. For example, a device could never report, in a single byte, that it had a capacity of 255 sheets. This sort of scheme is cumbersome, and is particularly difficult if the device must report measured data, which may return any range of values.

The second solution is to specify that a device stops responding to the master if the device detects a transmission error. After timing-out when waiting for a response that was never sent, the printer controller (master) then resends the command that was not completed. Generally, if there is no response to the retry, the master must declare that the optional device has experienced a fatal error. The limitation of this scheme is that the master cannot differentiate an "ailing" communications link from a general device malfunction that prevents the device from responding or prevents it from executing its control code reliably. Hence, the device cannot be serviced efficiently because the error cannot be accurately reported with this solution.

Another problem that exists with a multiple paper handling options printer system is the means by which addresses are allocated for each option.

One traditional scheme for setting the device's communication address is sometimes referred to as "Hard Coded Device Software". In this scheme, at design time the engineers of the printer system decide upon a unique address for each and every device making up the printer system. Then, each device "hard codes" its assigned address into its device software; thus, allowing such a device to communicate with the printer when addressed. The major disadvantage to this method is the fact that only one of any particular device can be configured as part of the printer system. Another disadvantage is that when it is attempted to connect and use the device in some other printer system, it may require a microcode modification to change its hard coded device address because the hard coded value may already exist for some other device in the other printer system. Thus, this device addressing method is inflexible.

Another traditional way in which the device's communication address may be set is often referred to as "Customer Settable Dip Switches". Each device has a set of dip switches on its electronics card. The setting of the dip switches is used to set the device's communications address. This method requires the customer to open up each device and set the dip switches according to a procedure found in their printer's user's guide. For example, the customer would begin by directly attaching devices to the printer and setting their dip switches to a certain value, and continue until all the devices in the printer system had their dip switches set. For this method, the customer may be also required to set a dip switch on the printer's electronic card indicating the number of devices attached to the printer system. A significant amount of customer setup time is required for a printer system with only a few optional devices, let alone a printer system with a moderate to a large number of devices. Devices employing this method are often costly to manufacture because each device, and the printer itself, must provide for customer accessibility to the dip switches.

Still another traditional way of setting the communication address of an optional device is often referred to as "Customer Settable NVRAM". For this method, the customer again follows a procedure in the user's guide of which part of this procedure is typing the device's address in via a keyboard or operator panel, and then writing into the device's NVRAM (nonvolatile random access memory) the address of a specified device. A part of this procedure requires the device to be directly attached to the "input hardware" used to set the device's address. From a customer standpoint, the most convenient "input hardware" would be the printer itself; however, most printers do not have a keyboard or operator panel suitable for entering devices' addresses, due to cost considerations. A personal computer may be a good second choice, but not all printer systems are attached to a personal computer allowing the luxury of using it as an input for the device addresses. Moreover, even if a personal computer were available, the customer would be required to connect the printer to a single optional device, use the personal computer to assign the device its address (per the procedure listed in the printer's user's guide), followed by disconnecting the device so another device could have its address set. Once this was done for all the devices, the customer could then setup the entire printer system. Thus, this method also may require a significant amount of customer setup time. Accordingly, such an NVRAM approach to printer option setup is not found on low cost personal or network printers. Moreover, since this method is "difficult" for most customers and customers these days are more and more sensitive to usability issues, including initial installation & setup, currently marketed printer systems generally do not employ this method to avoid the risk of being deemed "noncompetitive" by customers.

With the increase in function and sophistication of printer systems, a more efficient and cost effective printer system control apparatus and method which addresses the above-mentioned shortcomings are desired.

SUMMARY OF THE INVENTION

The present invention is directed to a printing system, which includes a printer having a printer controller; at least one optional support device, such as an intelligent paper handling device, having a first device controller; and a bi-directional serial communications path, including a first trunkline, interconnecting the printer controller to the first device controller. The first trunkline has a unique first trunkline address. The first device controller includes logic initially responsive to the unique first trunkline address. The printer controller automatically assigns a unique device address to any optional support device in the system, such that the printer controller commands the first device controller to be responsive to a first device address.

The printing system of the invention further includes an error detection system and method for detecting a transmission error. The error detection system is associated with at least one of the printer controller and an installed optional support device.

Another embodiment of an error detection system and method of the invention is directed to a printing system which includes a printer having a printer controller, an optional support device having a device controller and a communications link interconnecting the printer controller with the device controller. The printer controller sends to the optional support device a data signal, and the optional support device receives the data signal, generates an echo signal corresponding to the data signal and sends the echo signal to the printer controller. The printer controller receives the echo signal and compares the echo signal with the data signal to identify a transmission error.

Another embodiment of an error detection system and method of the invention is directed to an error detection system for a printing system including a printer having a printer controller, an optional support device having a device controller and a communications link interconnecting the printer controller with the device controller. The optional support device sends to the printer controller a data signal, and the printer controller receives the data signal, generates an echo signal corresponding to the data signal and sends the echo signal to the optional support device. The optional support device receives the echo signal and compares the echo signal with the data signal to identify a transmission error.

Still another embodiment of an error detection system and method of the invention is directed to a print system having a printer including a printer controller and a plurality of optional support devices associated with the printer, wherein each of the plurality of optional support devices includes a device controller. A bi-directional serial communications path provides serial electrical interconnection between the printer controller and each device controller of each of the plurality of optional support devices. The printer controller automatically assigns a unique device address to each of the plurality of optional support devices, and each of the plurality of optional support devices further includes logic circuitry which, based upon a command of the printer controller, enables passage of information generated by the printer controller through a first optional support device of the plurality of optional support devices to a next electrically serially connected optional support device following an assignment of a first device address to the first optional support device.

An error detection system is provided for detecting a transmission error, wherein the error detection system is associated with at least one of the printer controller and the plurality of optional support devices. The error detection system includes the printer controller, which sends to the plurality of optional support devices a data signal. A designated optional support device generates an echo signal corresponding to the data signal and sends the echo signal to the printer controller. The printer controller receives the echo signal and compares the echo signal with the data signal to detect the transmission error. Upon detection of the transmission error, the printer controller transmits a reset command to the plurality of optional support devices.

The designated optional support device may be one of a multiplicity of optional support devices on a serial communications trunkline, wherein the serial communications trunkline consists of at least a portion of the bi-directional serial communications path.

Other features and advantages of the invention may be determined from the drawings and detailed description of the invention that follow.

DETAILED DESCRIPTION OF PREFERRED EMBODIMENTS

Figure 1:
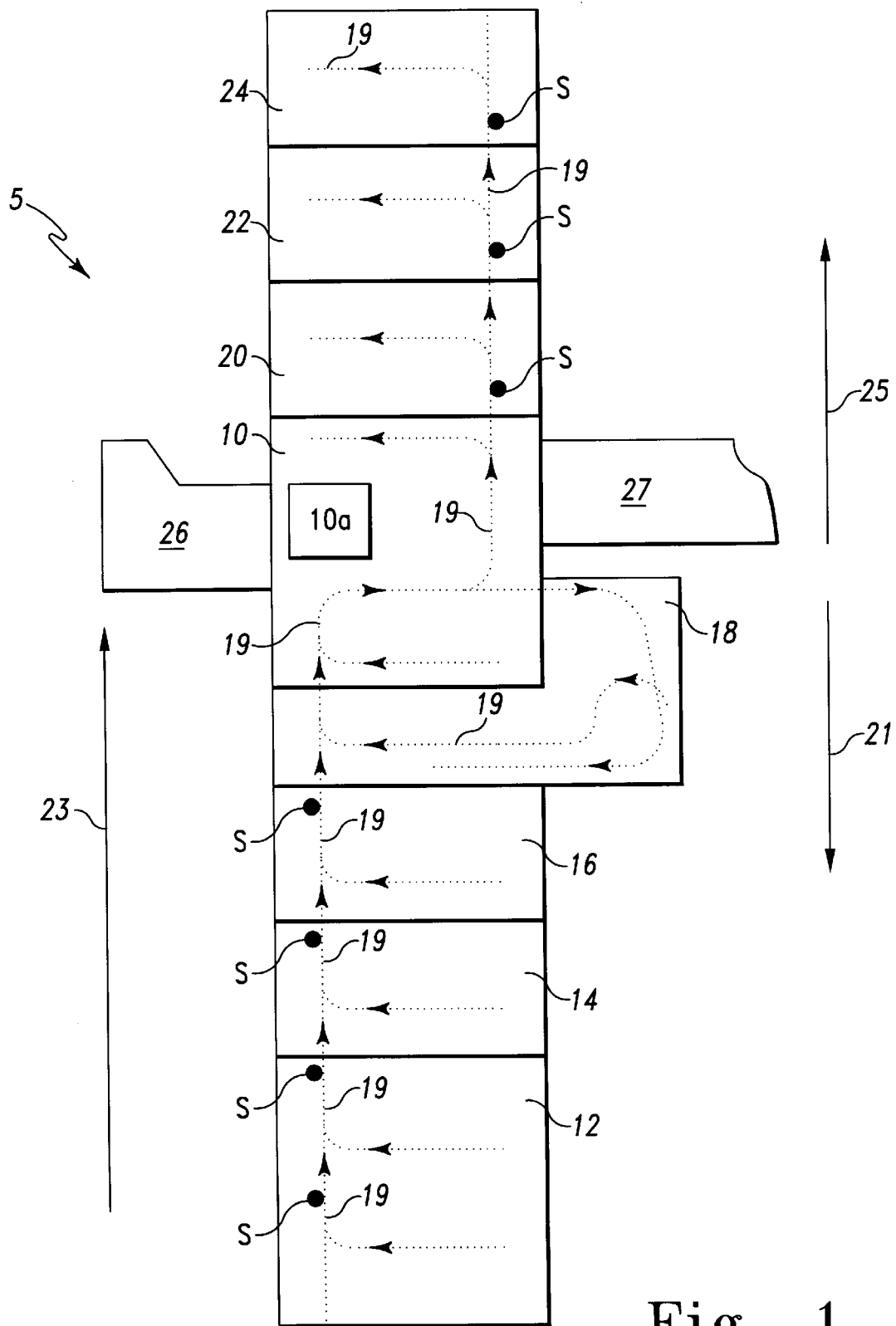
FIG. 1 is a simplified schematic diagram illustrating the paper path for an imaging system which includes a printer and several intelligent options.

FIG. 1 diagrammatically illustrates an expandable imaging system 5 which includes, for example, printer 10, such as a laser printer, coupled to a plurality of optional support devices 12, 14, 16, 18, 20, 22, 24, 26, and 27. Printer 10 and each of the optional support devices 12, 14, 16, 18 20, 22, 24, 26 and 27 are intelligent devices, in that each includes a programmable processor and associated memory. In preferred embodiments of the invention, printer 10 includes a power supply capable of supplying the electrical power requirements of system 5, including supplying electrical power to the optional support devices.

Printer 10 includes a printer controller 10a which performs tasks associated with generating a printed page, which include the task of providing master control over the operation of all of the optional support devices of system 5. In addition, printer controller 10a manages data communication within system 5, and includes, for example, a universal asynchronous receiver transmitter (UART). Printer controller 10a initiates all communications within system 5. Thus, optional support devices 12, 14, 16, 18, 20, 22, 24, 26 and 27 are subservient devices which perform and respond based on the commands, including polling requests, issued by printer controller 10a.

The optional support devices may comprise, for example, a plurality of media input sources such as a dual paper input tray 12, a pair of single paper input trays 14 and 16, and an envelope feeder 26; a duplexer 18; and a plurality of output media receptacles, such as paper output trays 20, 22 and 24, and miscellaneous output devices 27, such as a collator or a mailbox unit. The arrows 21, 23 and 25 generally indicate the direction of paper flow, while the dotted lines indicate a paper path 19 through both printer 10 and the optional support devices 12, 14, 16, 18, 20, 22 and 24. It should be recognized that there are numerous other paper handling devices that may be utilized with the printer as optional support devices, such as for example, output sorters and sorter/mailboxes. As is conventional in paper handling optional support devices, one or more sensors S are positioned adjacent to paper path 19 to determine paper position, or other information necessary for proper operation of the printer 10 and the optional support devices. Although the optional support devices described above are examples of paper handling devices, it should be noted that the optional support devices for system 5 are not limited to be paper handling devices.

To maintain overall control of the entire paper path 19, printer controller 10a sends commands to the optional support devices, which in turn send appropriate responses to these commands. As an example, printer controller 10a will send a command to pick a sheet from a media input source, e.g., one of the devices 12, 14 and 16, to cause a single sheet of paper to be fed into paper path 19 headed in the direction of the arrow heads. Thereafter, printer controller 10a will send a command to query the status of an optional support device to determine if that optional support device has detected any errors during the picking and feeding of a single sheet of paper into printer 10.

Figure 2:
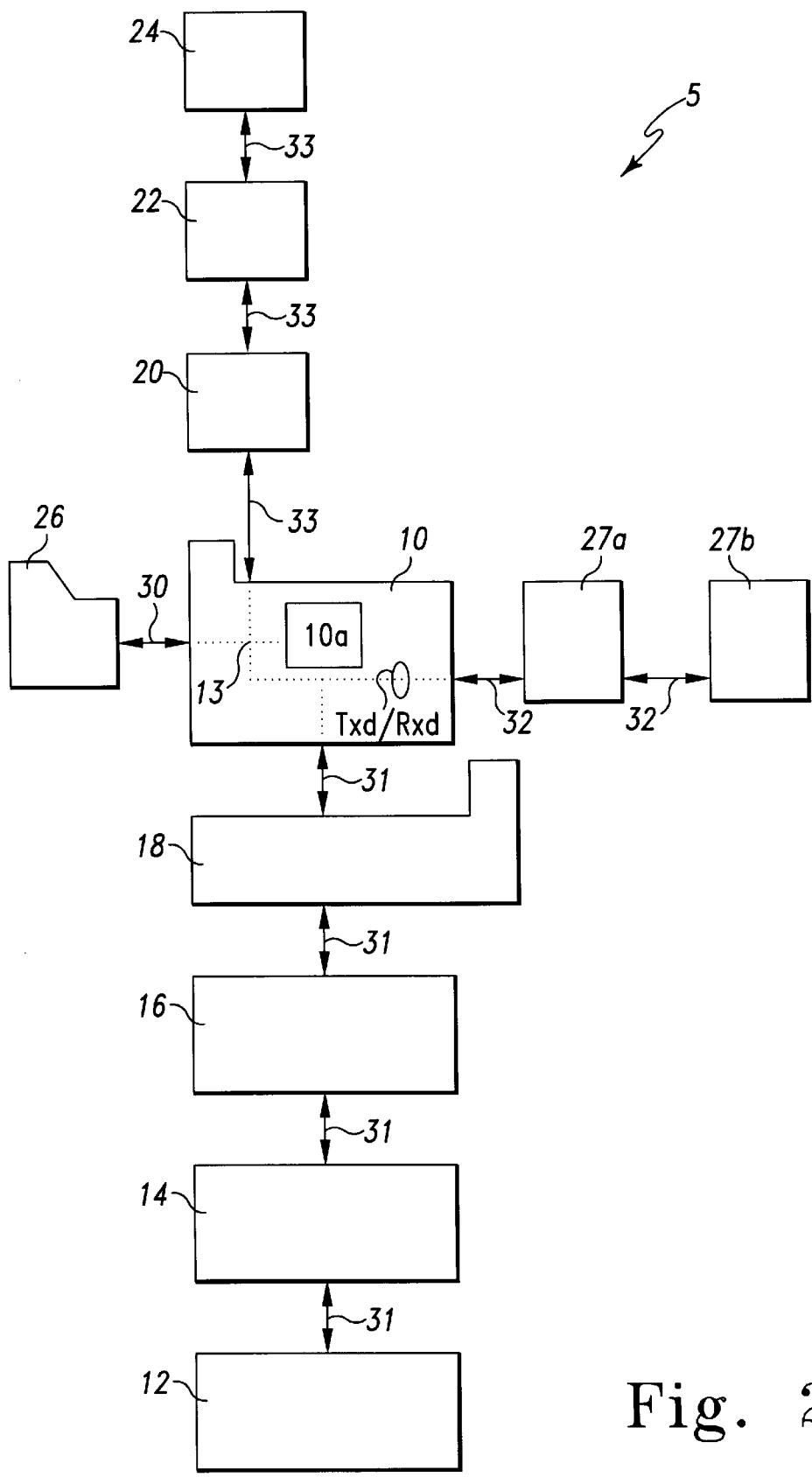
FIG. 2 is a further schematic drawing for a system, illustrating the manner in which a printer with four trunklines are connected via a bi-directional communication bus to intelligent optional support devices which are serially connected (daisy chained) in each trunkline.

FIG. 2 is a schematic illustration of a bi-directional communications interface used between printer 10 and the optional support devices 12, 14, 16, 18, 20, 22, 24, 26, 27a, and 27b. Printer controller 10a of printer 10 and the optional support devices communicate via a two-wire serial bus 13 and a plurality of trunklines 30, 31, 32, and 33. Communication between printer controller 10a and each of the optional support devices results in an information transfer therebetween in a frame, wherein each frame includes a predefined quantity of bits, such as for example, the eleven bit frame shown in FIG. 3.

Upon the startup, or power on reset (POR) of system 5, printer controller 10a initiates communication with the optional support devices by assigning a unique address to each of the optional support devices. Thereafter, data communication between printer controller 10a and each of the optional support devices can commence at the directive of printer controller 10a.

Referring to FIG. 2, bi-directional communications between printer controller 10a and the optional support devices is achieved, in part, via a plurality of separate communications trunklines 30, 31, 32, and 33 coupled to bus 13. In preferred embodiments of the invention, each communication trunkline is associated with a separate physical communication connection, or port, of printer 10 to which one optional support device is allowed to mechanically (or physically) attach. Each trunkline has a predefined unique communications address which will be referred to as a "trunkline address".

In preferred embodiments of the invention, each optional support device is designed for electrical attachment to one of the trunklines 30, 31, 32, and 33, and in turn is associated with the corresponding trunkline address. For example, as shown in FIG. 2, envelope feeder 26 is electrically coupled to printer 10 via trunkline 30; input trays 12, 14 and 16 and duplexer 18 are electrically coupled to printer 10 via trunkline 31; miscellaneous output devices 27a and 27b are electrically coupled to printer 10 via trunkline 32; and output trays 20, 22, and 24 are electrically coupled to printer 10 via trunkline 33.

Where multiple optional support devices, such as devices 12, 14, 16, and 18, are coupled to a common trunkline, such as trunkline 31, the multiple optional support devices are coupled one to another in a daisy-chain fashion. System 5 initialization occurs at power-on reset, and can occur at times selected by printer controller 10a after POR. The key activities comprising initialization are described below. At the time of system 5 initialization, none of the optional support devices have been assigned a device address by printer controller 10a; however, each optional support device assumes its predefined trunkline address, which resides in the device read only memory (ROM). Also, at initialization of system 5, the initial hardware/software state of each of the optional support devices is such that the next optional support device in the daisy-chain (on the same trunkline) is logically disconnected from bus 13. Thereafter, printer controller 10a sequentially assigns a unique device address to each optional support device, device by device, on each trunkline as a part of the system 5 initialization activities. This invention, in which optional support devices in system 5 are assigned device addresses by printer controller 10a, is done automatically by printer controller 10a without operator assistance.

Figure 4:
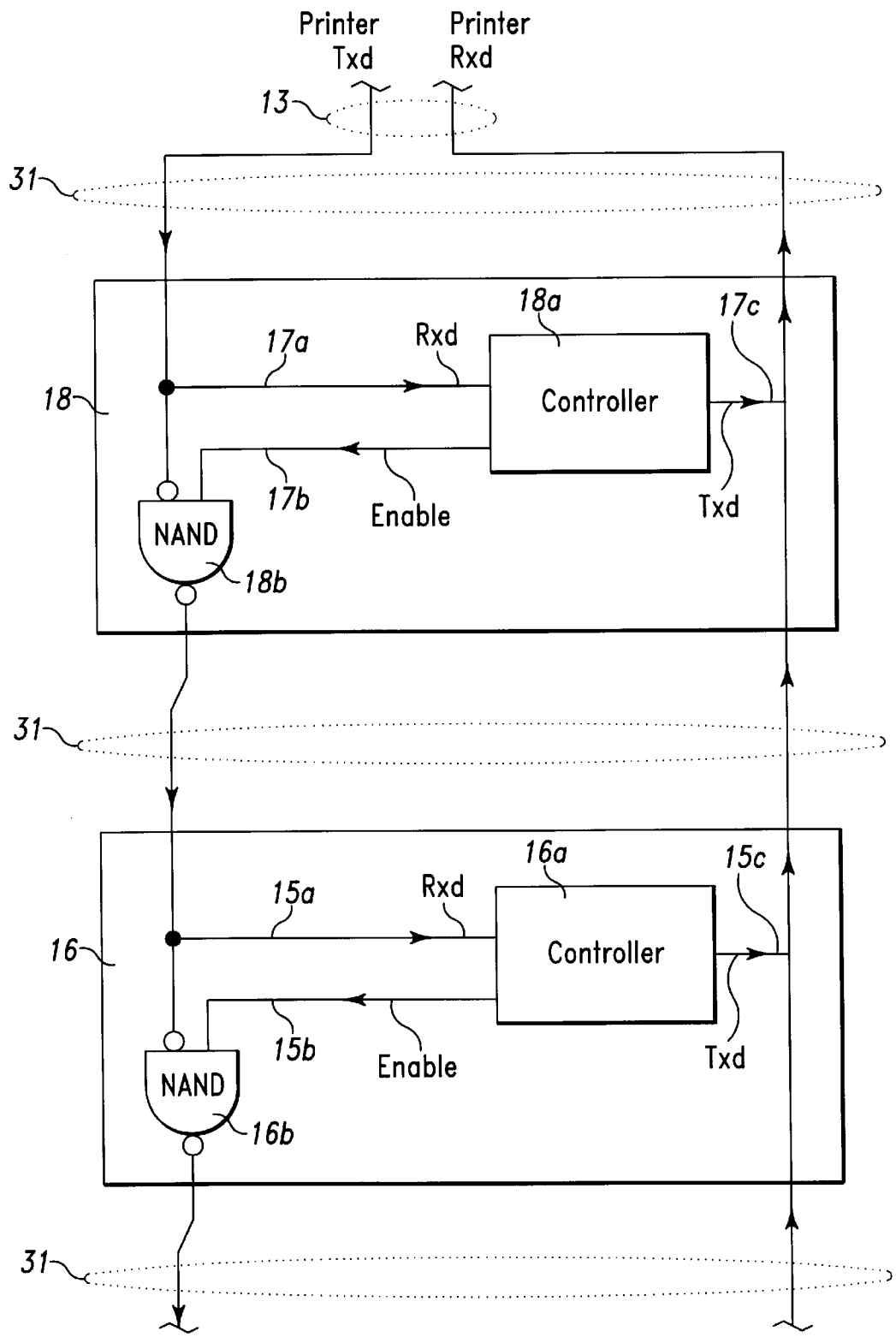
FIG. 4 is a logical, functional representation of special intelligent hardware inside each optional support device.

Referring now to FIG. 4, communications bus 13 is shown which includes printer transmit line Txd and printer 10 receive line Rxd. During system 5 initialization, each optional support device is responsible for selectively establishing a logical continuation of the printer transmit path Txd of communication bus 13 to the "next" optional support device. For example, as shown in FIGS. 2 and 4, optional support device 18 provides selective logical continuation of the printer 10 transmit path Txd to optional support device 16; optional support device 16 provides selective logical continuation of the printer 10 transmit path Txd to the optional support device 14; and optional support device 14 provides selective logical continuation of the printer 10 transmit path Txd to optional support device 12. Also, the daisy-chained optional support devices provide ungated electrical continuation of the printer 10 receive path Rxd, from one device to the next in the daisy-chain to printer 10.

By way of example, FIG. 4 schematically illustrates the electrical connections and circuitry associated with optional support devices 16 and 18, and it is to be understood that similar electrical connections and circuitry are present as to each optional support device of system 5. Optional support device 16 includes a controller 16a comprising a microprocessor, UART and associated logic, and logic gate 16b; and, optional support device 18 includes a controller 18a comprising a microprocessor, UART and associated logic circuitry, and logic gate 18b. Optional support device 18 is directly electrically connected to communications bus 13 via trunkline 31, such that printer line Txd is connected to a first input of the two input NAND gate 18b. Printer line Txd is also connected to a device receive port 17a of controller 18a. An enable output 17b of controller 18a is coupled to a second input of two input NAND gate 18b. Controller 18a further includes a transmit port 17c directly connected to printer receive line Rxd. NAND gate 18b further includes an output which is coupled via trunkline 31 to a first input of the two input NAND gate 16b. The output of NAND gate 18b is also connected to a device receive port 15a of controller 16a. An enable output 15b of controller 16a is coupled to a second input of two input NAND gate 16b. Controller 16a further includes a transmit port 15c directly connected to printer receive line Rxd via trunkline 31. Thus, as shown in FIG. 4, when NAND gate 18b is enabled, printer line Txd and trunkline 31 are effectively continued through optional support device 18. Also, when NAND gate 16b is enabled, printer line Txd and trunkline 31 are effectively continued through optional support device 16.

Prior to initialization of system 5, each optional support device assumes the trunkline address which is stored in read only memory in the controller of the optional support device, and each optional support device logically discontinues the printer line Txd to the next downline device in the daisy-chain by disabling its associated logic gate. During initialization of system 5, however, printer controller 10a sequentially brings each optional support device online by assigning a unique device address to each optional support device, and after the unique device is assigned to a particular optional support device, then printer controller 10a commands that optional support device to enable its associated logic gate so as to continue printer transmit line Txd of communications bus 13 and associated trunkline to the next optional support device in the daisy-chain. The details of the device address assignment process are explained below with reference to FIGS. 2 and 5.

Figure 5:
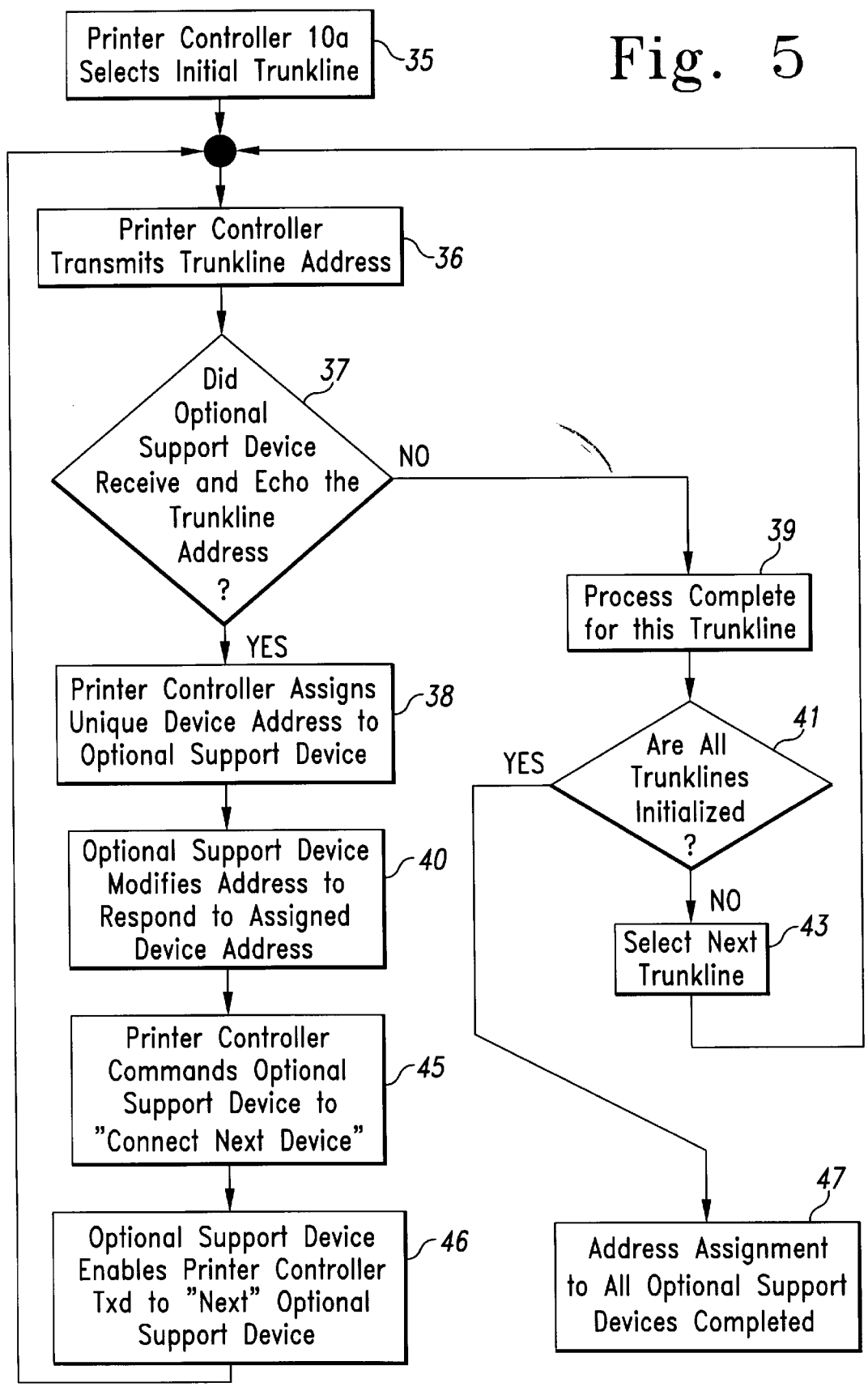
FIG. 5 is a diagrammatic flow chart indicating the manner in which, at initialization, each optional support device is given a unique address by the printer controller such that each individual optional support device may be addressed and given separate commands.

FIG. 5 illustrates the process of assigning device addresses to each optional support device on a particular trunkline of system 5. It should be understood that in preferred embodiments of the invention, this process is repeated for each trunkline of system 5 until all optional support devices have been assigned a unique device address. Printer controller 10a (FIG. 2) of the printer 10, in conjunction with special communications bus hardware, utilizes a specific procedure at initialization of system 5 to assign each optional support device its unique device address. At initialization, printer 10 selects an initial trunkline (step 35). At step 36, printer controller 10*a* sends via printer transmit line Txd a frame of information containing a trunkline address associated with the selected trunkline. Then, at step 37, printer controller 10*a* determines whether the optional support device received the trunkline address by awaiting an acknowledgment (the trunkline address echo) within a predefined time period from the device via printer receive line Rxd. If there is no response received by printer controller 10*a*, i.e. the answer to decision block 37 is "No", then the process is complete for that trunkline (step 39), i.e., no further devices are recognized as being connected to the selected trunkline. Processor 10*a* then determines at step 41 whether all trunklines have been serviced. If "Yes", then address assignment is complete (step 47) for system 5. If "No", there are further trunklines to be considered then at step 43 the next trunkline is selected and the address assignment resumes at step 36.

If, however, it is determined by printer controller 10*a* at step 37 that the optional support device received the trunkline address based upon the timely receipt of an acknowledgment from the optional support device via printer receive line Rxd, then at step 38 printer controller 10*a* assigns a unique device address to the optional support device. At step 40, the optional support device modifies its address to that of the assigned device address. Now that the optional support device has received its unique device address it will, for all future communications with the printer 10, only respond to the printer when addressed via the unique device address just assigned.

At step 45, printer controller 10*a* sends to the optional support device a command to logically connect the next optional support device in the daisy-chain, if any, and in response at step 46, the device enables the gate logic (see FIG. 4) to continue the printer transmit line Txd to the next optional support device in the daisy-chain.

Thus, for example, the first optional support device 18 on the trunkline 31 has its own unique device address, and printer controller 10*a* can communicate with the "next" daisy-chained device 16 by addressing optional device 16 via the trunkline address. Note that the "previous" device 18 will no longer respond to the trunkline address, since optional support device 18 has received its unique device address. Printer controller 10*a* then repeats this procedure with the "next" device 16 to assign to device 16 a unique device address. It is now apparent that this process is repeated until each optional support device 18, 16, 14, and 12 on trunkline 31 is assigned a unique device address (steps 36, 37, 38, 40, 45, 46), and then the process continues through steps 39, 41, 43 to select a next trunkline, e.g., one of trunklines 30, 32, and 33, at which time steps 36, 37, 38, 40, 45, 46 are performed for each optional support device on the next selected trunkline.

Following is a description of the communications interface which is the method by which individual frames, containing bytes of information, are transmitted between the master printer controller 10*a* and the optional support devices.

Referring to FIG. 4, the physical communications bus 13 is a serial interface with separate printer transmit (Txd) and receive (Rxd) signal lines. The printer controller 10*a* and optional support devices transmit information frame-by-frame via UARTs (Universal Asynchronous Receiver/Transmitters). Although this hardware configuration could support full duplex communications (data transmitted simultaneously on the Txd and Rxd lines), the communications protocol, set forth hereinafter, specifies that the Txd and Rxd lines are not simultaneously active.

Figure 3:
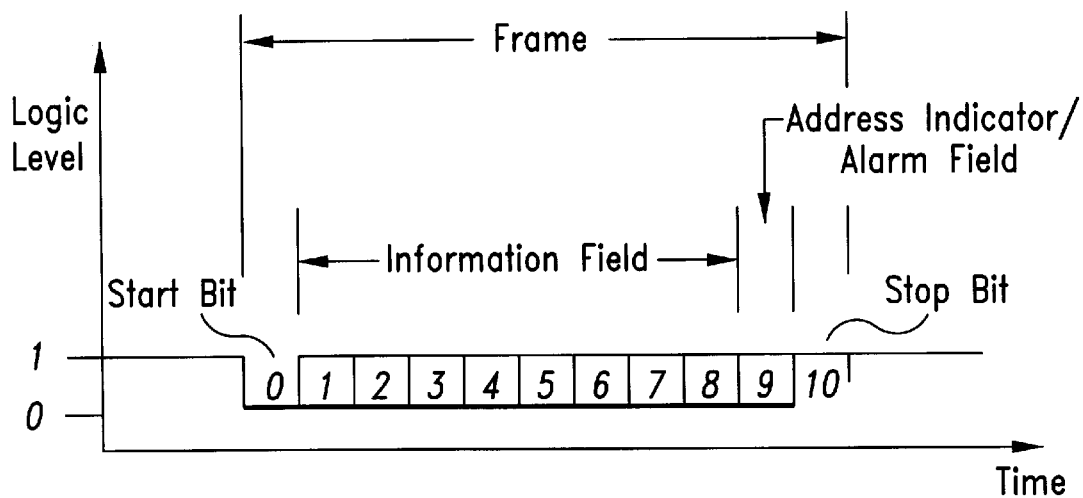
FIG. 3 is a 11 bit serial frame employed with the serial, bi-directional communication scheme of the present invention.

Referencing FIG. 3, information is transmitted serially in an 11-bit frame: a start bit (value 0), an information field comprised of 8 data bits (LSB first), an address indicator/alarm field comprised of a programmable $9^{th}$ data bit, and a stop bit (value 1). The use of the address indicator allows the communications bus 13 to support a single master printer controller 10*a* with multiple optional support devices. The preferred embodiment is best implemented with UART hardware that supports the use of the programmable $9^{th}$ data bit as the address indicator/alarm field. Examples of microprocessors that contain such a UART are the Philips 8052 and Toshiba TMP90CM38. When the master printer controller 10*a* transmits data to one of the several optional support devices, it first sends an address frame which identifies the target optional support device. The address frame differs from a data frame in that the programmable $9^{th}$ data bit is 1 for address frames and zero for data frames. Each optional support device is initially configured by its internal program code such that its controller (e.g. 16*a* on FIG. 4) is interrupted only when an address frame is received. The optional support device is not interrupted when a data frame is received. Thus, an address frame (one with the programmable $9^{th}$ data bit set) will interrupt all optional support devices simultaneously, giving each an opportunity to determine if it is the optional support device being addressed. The addressed optional support device then configures its controller to be interrupted for the data frames (programmable $9^{th}$ data bit=0) that will follow. The master printer controller 10*a* then transmits data frames, which only the addressed optional support device receives. All the other optional support devices do not receive these data frames, since their controller will only be interrupted by address frames (programmable $9^{th}$ data bit=1). When the printer controller 10*a* completes sending data frames to the addressed optional support device, the printer control 10*a* then may address an optional support device, if desired, by transmitting an address frame containing the address of the optional support device desired.

The relationship between printer controller 10*a* and optional support devices allows the printer controller 10*a* to communicate with one optional support device at any given time, or communicate to all optional support devices simultaneously, termed "broadcasting". Communications can be initiated by the printer controller 10*a* only. Therefore, the printer controller 10*a* must query an optional support device to detect any status change in that optional support device.

When the printer controller 10*a* communicates with a single optional support device, and is not "broadcasting", the printer controller 10*a* always transmits a single frame to the optional support device, and in turn, the addressed optional support device always responds by transmitting a single frame back to printer controller 10*a*.

Figure 6:
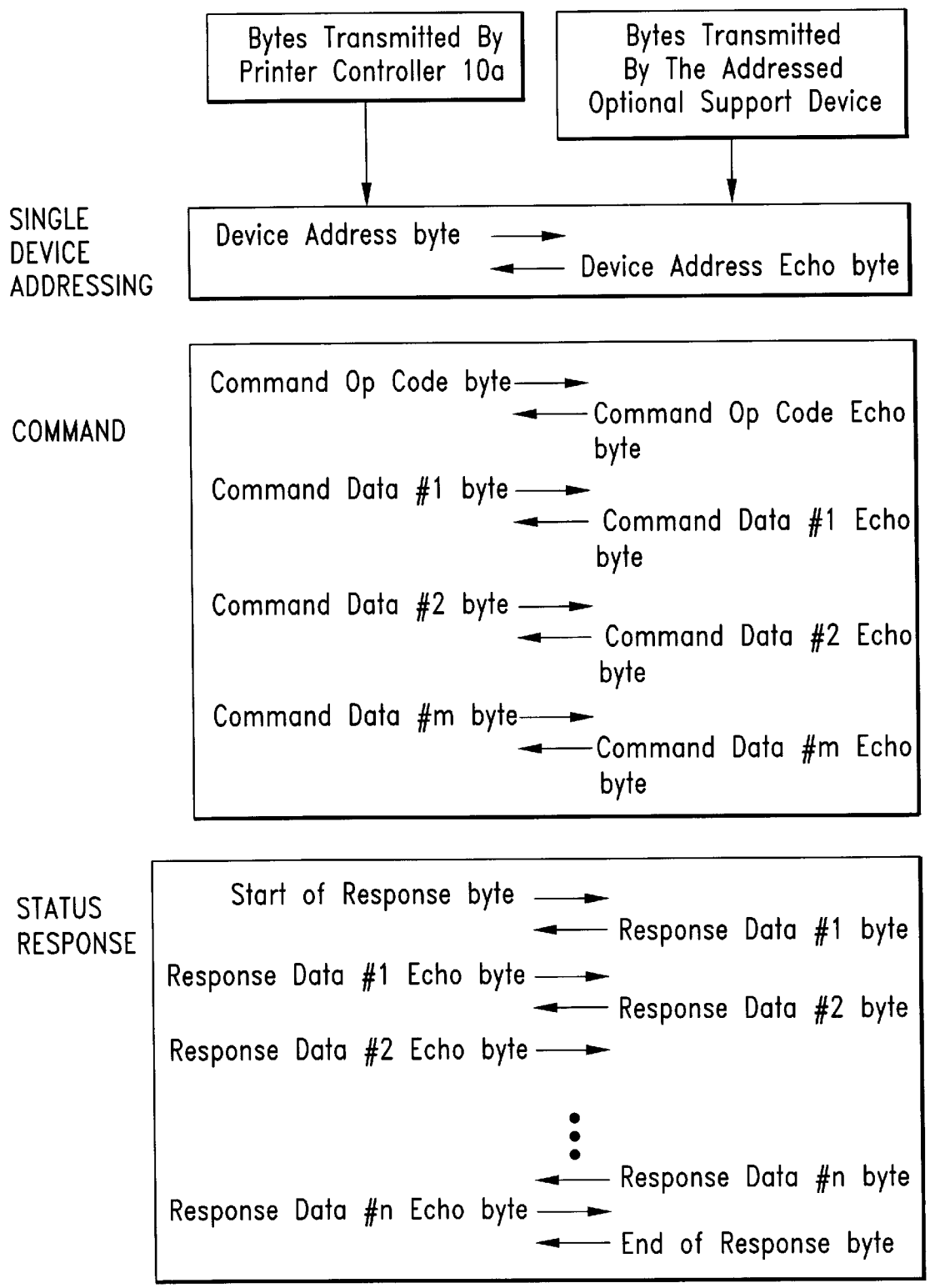
FIG. 6 is a diagrammatic representation of the standard communications syntax for a single optional support device, and illustrating the addressing of the single support device and a command sent (transmitted) by the printer controller and the responses sent by the addressed optional support device.

This present invention utilizes "echoing" in the communications between the printer controller 10*a* and any and all optional support devices. "Echoing" is the defined communications protocol, which complies with the one-frame-down one-frame-back alternation described above, where the information field, (shown in FIG. 3.), in a frame sent by the optional support device to the printer controller 10*a* is identical to the information field in the frame most recently received by the optional support device from printer controller 10*a*. As shown in FIG. 6., the printer controller 10*a* addresses a single optional support device by sending an address frame containing the address of the optional support device, (device address byte) after which the addressed optional support device echoes the received address (device address echo byte) in a data frame. Additionally, echoing is defined as the communications protocol in which the information field in a frame sent by the printer controller 10*a* to the optional support device is identical to the information field in the frame most recently received from the optional support device.

The printer controller 10*a* and optional support devices communicate via commands and status responses. The printer controller 10*a* transmits commands to the optional support device in order to control the optional support device and to instruct the optional support device to perform desired operations. Some commands solicit the status of the optional support device to which the optional support device responds with the appropriate status response. Following is a description of how transmissions are grouped together to form commands and status responses, which allow information to flow between the printer controller 10*a* and a single, addressed optional support device. This form of communications is defined as the "Standard Communications Syntax", and is shown in FIG. 6. In FIG. 6, the arrows to the right represent the transmission of the information field of the frame, described in FIG. 3, transmitted by printer controller 10*a*. The arrows pointing to the left indicate the transmission of the information field of the frame transmitted by the optional support device and received by printer controller 10*a*. A "command" consists of an Op Code (operation code) and zero or more Command Data (i.e., command parameter) bytes. A "status response" may comprise of zero or more Response Data (i.e., status) bytes. It may be noted at this time that some commands have no associated status response, i.e. zero Response Data bytes are transmitted by the optional support device for that command. Specific commands that are defined to have no associated status response are a special case of the Standard Communications Syntax, and are discussed later.

The communications protocol described previously in which the printer controller 10*a* and optional support device alternate single-frame transmissions, is used to pace the multiple transmissions that comprise each command and status response. For each frame transmitted by the printer controller 10*a*, the addressed optional support device responds with a corresponding frame.

Referring to FIG. 6, assuming an operational system 5, i.e., after initialization, the first frame transmitted by printer controller 10*a* is the specific device address (device address byte) for the optional support device to which printer controller 10*a* desires to send a command. Upon receiving the transmission, the optional support device of which corresponds to this device address, responds by echoing back to printer controller 10*a* the address received (device address echo byte). The next frame transmitted by printer controller 10*a* contains the Command Op Code. This is a single byte that identifies the specific command, that is being sent to the addressed optional support device. The device echoes the Command Op Code back to printer controller 10*a*, this echo is referred to as the Command Op Code Echo byte (see FIG. 6). The echoing contained throughout the syntax is used to support communication error detection and error handling. Depending on the definition of the specific command being sent, the printer controller 10*a* sends a specified number of Command Data bytes to the addressed optional support device. These bytes are identified as Command Data #1 through Command Data #m. For each Command Data byte transmitted by printer controller 10*a* the optional support device echoes the Command Data byte back to printer controller 10*a*. The echoed bytes are identical to the corresponding Command Data bytes sent from printer controller 10*a* and received by the optional support device. The number of Command Data bytes is specified by a particular command and may be zero. For the case of zero Command Data bytes, the command is fully specified by the Command Op Code.

Some commands require a status response from the addressed optional support device, whereas some commands do not. When printer controller 10*a* has transmitted a command that requires a status response from the optional support device, after all command bytes have been transmitted to that optional support device, and echoed, printer controller 10*a* turns around the direction of data flow by sending a Start of Response byte, as shown in FIG. 6. The Start of Response byte is a single, defined, constant value that conveys no specific information beyond indicating that the transmitting of a status response can now begin from the optional support device. In the preferred embodiment, the Start of Response byte is hexadecimal AA.

After receiving the Start of Response byte, the optional support device begins the status response. The response information is contained in the Response Data bytes, identified as Response Data #1 through Response Data #n, with the number n depending on the particular status response being transmitted. The response data bytes are individually echoed from printer controller 10*a* back to the addressed optional support device. The echoed bytes are identical to the corresponding Response Data bytes transmitted from the optional support device. The echoing contained throughout the syntax is employed to support transmission error detection on bus 13 (FIG. 2). To comply with the communication protocol of one-frame-down one-frame-back, the queried optional support device terminates the status response by sending the End of Response byte to printer controller 10*a*. The End of Response byte is a single, defined, constant value that terminates the transmission of the status response. In the preferred embodiment, the End of Response byte is hexadecimal CC. This byte is not meant to contain any specific information.

As noted above, the definition of a particular command may specify that there is no corresponding status response. For such commands, the entire status response is eliminated—i.e., there is no Start of Response byte, no Response Data bytes, no Response Data Echo bytes, and no End of Response byte. This modification of the syntax is done to optimize the overall usage of the bus.

A unique communications syntax referred to as the "Non-Echoing Communications Syntax" is described below. The echoing that is included in the definition of the Standard Communications Syntax is used to aid in the detection of transmission errors on bus 13. However, there are instances when the bus 13 bandwidth is used more efficiently if the redundancy of echoing is not present in communications on bus 13. The "Non-Echoing Communications Syntax", shown in FIG. 7 defines a syntax for commands that do not utilize echoing. The optional support device does not echo the Command Op Code byte or the Command Data bytes sent from printer controller 10*a*, and likewise printer controller 10*a* does not echo the Response Data bytes from the optional support device. The commands being transmitted from printer controller 10*a* are intermingled with the response bytes being transmitted from the optional support device to printer controller 10*a*.

Figure 7:
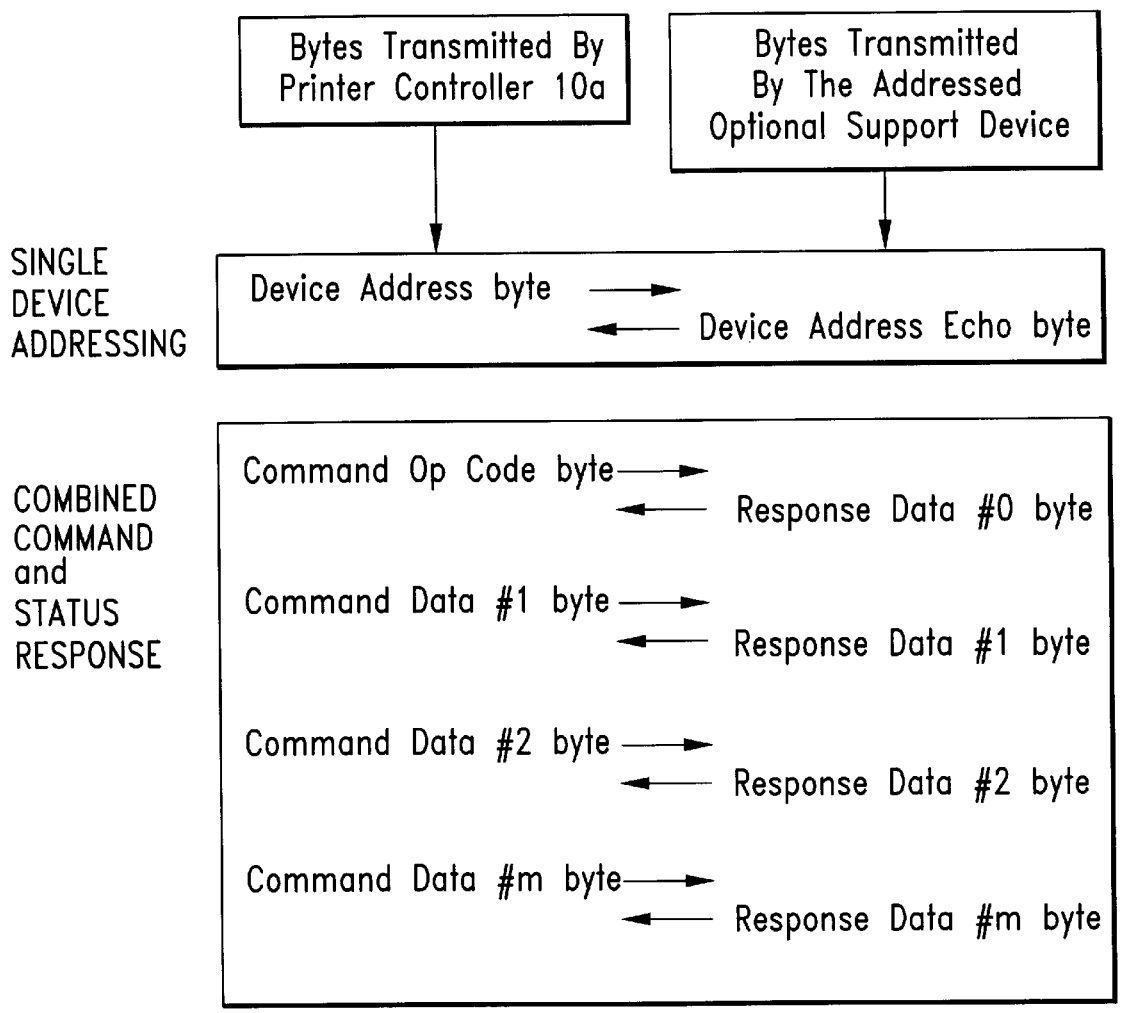
FIG. 7 is a diagrammatic representation of the non-echoing communications syntax (non-echoing) for a single optional support device, and illustrating commands sent (transmitted) by the printer controller and responses sent by the addressed optional support device.

An example of a command that utilizes the Non-Echoing Syntax is "Query Device Status", which requests the status of sensors in the addressed optional support device, such as one of 12, 14, and 16, to track the position (leading edge) of a sheet in paper path 19, shown in FIG. 1. The Query Device Status command is defined as a command that only contains the Command Op Code and a single Response Data byte as shown in FIG. 7. A response by the optional support device to the Query Device Status command is bit-encoded and contains two bits that provide status (e.g., covered or uncovered) of the paper sensors S located, in that individual optional support device as shown in FIG. 1. In this example, printer controller 10*a* is tracking the position of the leading edge of a sheet as the leading edge approaches sensor S in an optional support device. Printer controller 10*a* sends the Query Device Status command many times, at a relatively high frequency, until the response bit corresponding to sensor S finally changes status (e.g., changes from uncovered to covered).

"Broadcast Communications" is defined as the protocol whereby printer controller 10*a* transmits a command to all optional support devices simultaneously. In the preferred embodiment, prior to utilizing Broadcast Communications, printer controller 10*a* designates one of the optional support devices to be responsible for echoing all broadcast communications transmissions by printer controller 10*a*. All other optional support devices do not echo any of the broadcast communications transmissions by printer controller 10*a*. The echoing provided by the designated optional support device allows printer controller 10*a* to utilize the data communications checking described below and facilitated by the Standard Communications Syntax.

Figure 8:
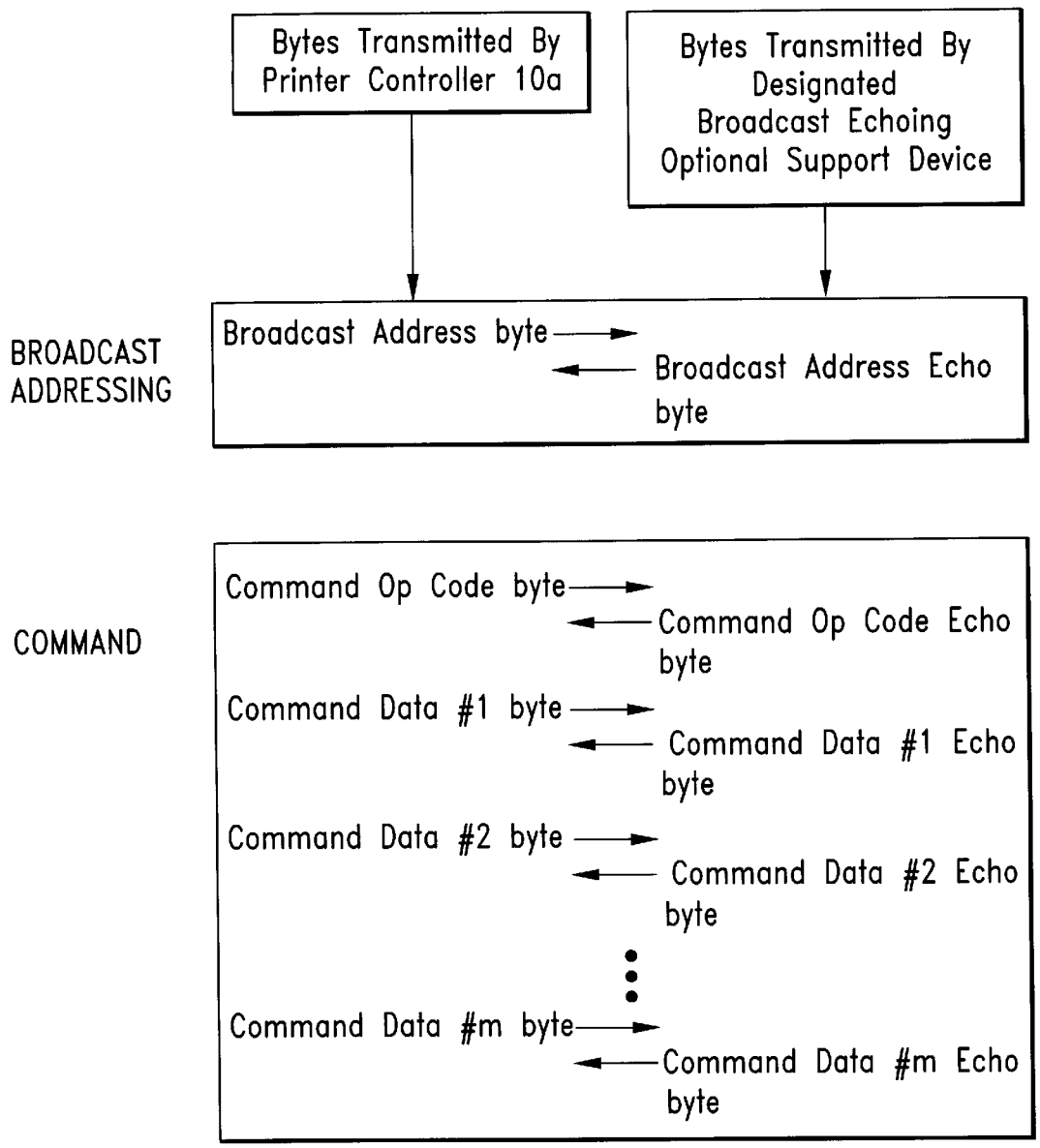
FIG. 8 is a diagrammatic representation of the standard communications syntax for multiple devices, and illustrating a feature of the present invention in which a "broadcast address" byte is given to command all optional support devices in all of the trunklines, that the commands that follow are applicable to all devices, and the command bytes are echoed only by one single designated optional support device.

FIG. 8 illustrates Broadcast Communications. Printer controller 10*a* first transmits a unique "broadcast address" on bus 13 (FIG. 2) of which all optional support devices receive and enters Broadcast Communications (as described above). The optional support device, which had previously been designated the task of echoing all transmissions by printer controller 10*a*, echoes the broadcast address (FIG. 8) back to printer controller 10*a*. FIG. 8 further illustrates commands broadcasted to all optional support devices of which the designated broadcast echoing optional support device is shown echoing the commands transmitted by printer controller 10*a*.

In an alternate embodiment, printer controller 10*a* may choose not to designate one of the optional support devices as the optional support device to echo back printer controller 10*a* transmissions. In the alternate embodiment, the echoing shown in FIG. 8 does not occur.

Figure 9:
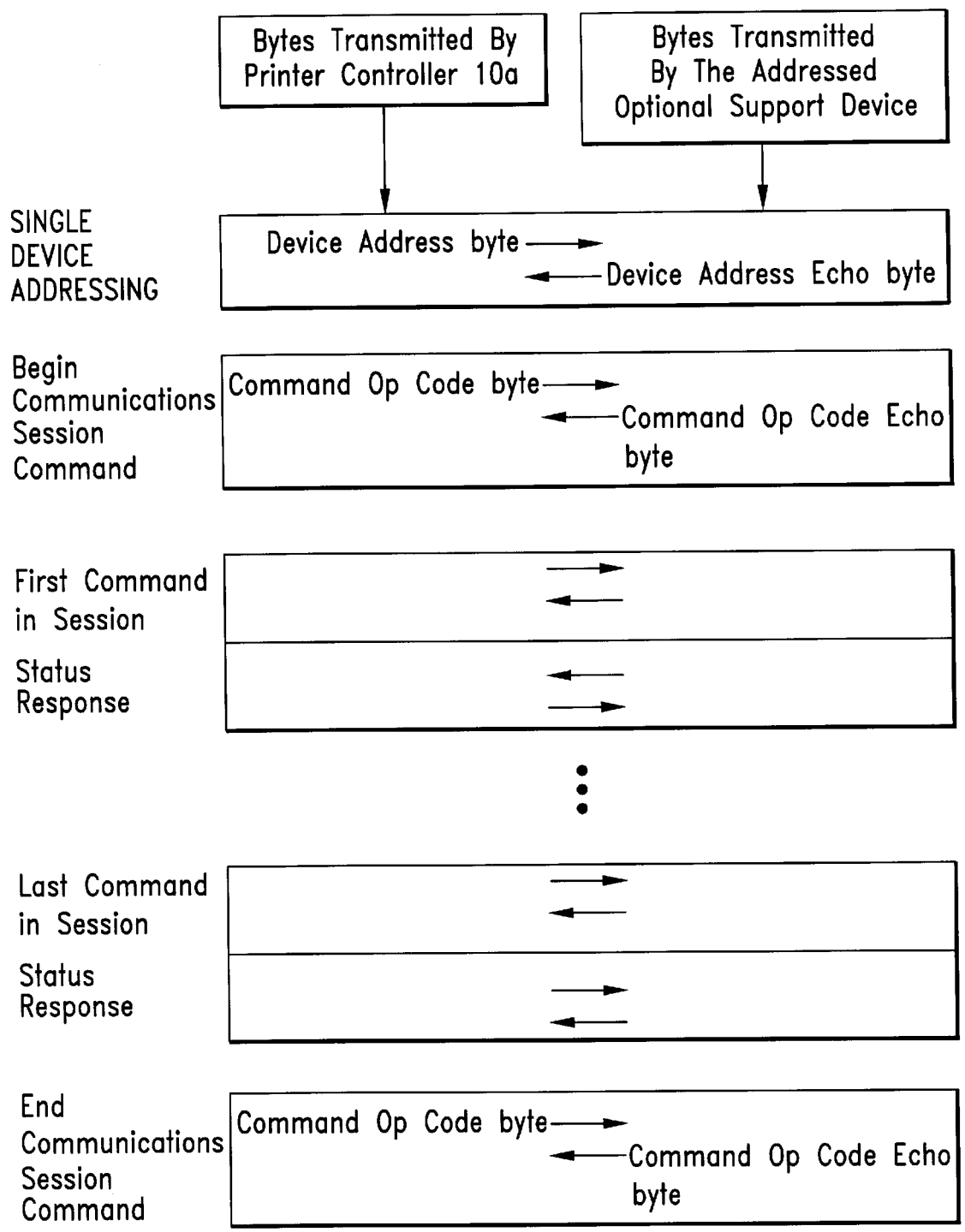
FIG. 9 is a diagrammatic representation of the general format for a "communications session".

The "communications session" is a feature of the invention that pertains to situations in which printer controller 10*a* desires to transmit several commands in succession to one particular optional support device. Within the "communications session," printer controller 10*a* does not transmit the device address before each successive command. The general format for a communications session is shown in FIG. 9. First, the optional support device is addressed by printer controller 10*a*. Then, the communications session is opened (begun) with a "Begin Communications Session" command transmitted by printer controller 10*a*. Next, printer controller 10*a* transmits the desired sequence of commands to the optional support device. Finally, printer controller 10*a* terminates the communications session by transmitting an "End Communications Session" command. After the End Communications Session command is received by the optional support device, the next command transmitted to that optional support device must be preceded by an address frame which contains the device address of that optional support device or the Broadcast Address.

An advantage of being able to send several commands within a communications session is to improve the usage of bus 13 (FIG. 2) bandwidth, since the overhead of addressing the optional support device is spread over several commands. Thus the total transmission time for a set of commands, is less than would result if the device address were sent before each command transmitted to the optional support device.

A feature of the invention is the communication interface error detection capability. The echo bytes specified in the Standard Communications Syntax allow printer controller 10*a* and optional support devices to detect certain transmission errors. Also, the specific UART hardware employed by printer controller 10*a* and the optional support devices provide additional transmission error detection capabilities.

Bus 13 error detection capabilities included in the invention allow the detection of communication errors arising from, for example, but not limited to, intermittent signal connections and electrostatic discharges. The ability to detect transmission errors on bus 13 prevents corrupted data from causing unpredictable behavior of system 5. Communication interface transmission error detection on bus 13 is performed by both printer controller 10*a* and optional support devices.

Transmission error detection performed by printer controller 10*a* on the communications interface is described below.

The UART of printer controller 10*a* has the capability to detect certain bus 13 transmission errors, such as framing errors. Whenever printer controller 10*a* detects a transmission error in a received frame, it aborts processing the current command, and then transmits an address frame containing the unique "Link Reset" address on bus 13. Upon receiving the Link Reset address, each optional support device aborts any command that it may be processing, and re-initializes its UART, communications protocol processing, and command interpreter to the state in which the optional support device is waiting to be addressed. Each given optional support device still responds to the same uniquely assigned is address that it received from printer controller 10*a* during initialization, i.e., a Link Reset does not cause optional support devices to return to their trunkline address. All optional support devices receive the Link Reset, since the programmable 9th data bit is set as part of the Link Reset frame transmitted. Each optional support device, when processing a command or status response, must examine the programmable 9th data bit for all frames received from printer controller 10*a* to determine if a Link Reset has been transmitted.

Printer controller 10*a* also has the capability to detect bus 13 transmission errors that corrupt the value of the information field in a frame received from an optional support device, after which printer controller 10*a* transmits the Link Reset. Printer controller 10*a* detects such transmission errors by examining the echo byte received from the optional support devices; i.e., the Device Address Echo, Command Op Code Echo, and Command Data Echo, which are shown in FIG. 6.

After transmitting the Device Address byte, the printer controller 10*a* compares the value of the Device Address Echo byte transmitted by the optional support device to the Device Address byte that was transmitted by printer controller 10*a*. If the two values differ, printer controller 10*a* determines that a transmission error has occurred and transmits the Link Reset. In a similar manner, printer controller 10a compares the Command Op Code byte transmitted to the resulting Command Op Code Echo byte received from the optional support device. If they are not identical, printer controller 10a likewise transmits the Link Reset. In a similar manner, printer controller 10a compares each Command Data byte transmitted to the resulting Command Data Echo byte received from the optional support device. If they are not identical, printer controller 10a transmits the Link Reset. Printer controller 10a does not examine any Response Data byte value for possible transmission errors. Transmission errors that corrupt a Response Data byte are detected and reported by the optional support device as described below. If printer controller 10a detects an error in the transmission of the End of Response byte, it transmits the Link Reset. Another instance in which printer controller 10a transmits the Link Reset is when any expected transmission from the optional support device is not received within a specified time.

As described earlier, during broadcast communications, one designated optional support device echoes the transmissions from printer controller 10a. Printer controller 10a utilizes these echoes to detect transmission errors in the same manner as described above, during broadcast communications.

Transmission error detection performed by optional support devices on the communication interface is described below. The UART of each optional support device has the capability to detect certain transmission errors on bus 13 (FIG. 2). Whenever an optional support device detects a transmission error in a received frame, the optional support device reports the occurrence of the error by setting the address indicator/alarm field (the programmable 9th data bit) in the next frame transmitted to printer controller 10a. The information field in that frame is the same as it would have been if no transmission error were being reported; i.e., no special information field value is transmitted by the optional support device for this situation. In addition to reporting the bus 13 transmission error to printer controller 10a, the optional support device aborts processing the command or status response in process. Printer controller 10a examines the programmable 9th data bit for every frame received from the optional support devices. When printer controller 10a recognizes that the optional support device has detected a transmission error on bus 13, printer controller 10a transmits a Link Reset.

The optional support device also has the capability to detect bus 13 transmission errors that corrupt the value of the information field in a frame received from the printer controller 10a, after which the optional support device reports a transmission error on bus 13 to printer controller 10a by setting the programmable 9th data bit in the next frame transmitted to printer controller 10a. Referring to FIG. 6, the addressed optional support device examines the Command Op Code byte value received from printer controller 10a. If the Command Op Code byte value is not a valid op code value, the optional support device reports that a transmission error has occurred. The addressed optional support device does not examine the Command Data byte value for possible bus 13 (FIG. 2) transmission errors. Transmission errors that corrupt a Command Data byte are detected by the printer controller 10a when it examines the corresponding Command Data Echo byte transmitted by the optional support device. The addressed optional support device examines the Start of Response byte value received from printer controller 10a. If the value is not identical to the predefined Start of Response byte value, the optional support device reports that a transmission error has occurred in the manner described above. Likewise, the addressed optional support device compares the received Response Data #n Echo byte transmitted by a printer controller 10a to the corresponding Response Data #n byte that was transmitted to printer controller 10a. If the values are not identical, the optional support device reports that a transmission error has occurred.

For broadcast communications, the optional support device previously designated by printer controller 10a to be the echoing device, detects and reports transmission errors during broadcast communications, in the same manner as described above.

Although the invention has been described with respect to preferred embodiments, those skilled in the art will recognize that changes may be made as to form and detail without departing from the spirit and scope of the following claims.

What is claimed is:

1. A printing system, comprising:
   a printer including a printer controller;
   an optional support device including a first device controller;
   a first bi-directional serial communications trunkline interconnecting said printer controller to said first device controller, said first trunkline having a unique first trunkline address, and wherein said first device controller includes means initially responsive to said unique first trunkline address,
   wherein said printer controller automatically assigns a unique device address to any optional support device in said system such that said printer controller commands said first device controller to be responsive to a first device address; and
   a transmission error detection system for detecting a transmission error, said transmission error comprising a failed attempt to transmit information between said printer controller and said optional support device, said error detection system being associated with at least one of said printer controller and said optional support device.

2. The system of claim 1, wherein said error detection system comprises:
   said printer controller, which sends to said optional support device a data signal; and
   wherein said optional support device receives said data signal, generates an echo signal corresponding to and uniquely specifying said data signal and sends said echo signal to said printer controller, and
   wherein said printer controller receives said echo signal and compares said echo signal with said data signal to detect said transmission error.

3. The system of claim 2, wherein upon detection of said transmission error, said printer controller transmits a reset command to said optional support device.

4. The system of claim 1, wherein said first device controller sets a predefined bit in a data frame to be transmitted to said printer controller upon detection of said transmission error.

5. The system of claim 4, wherein said predefined bit comprises a ninth bit of a plurality of bits.

6. The system of claim 4, wherein said predefined bit comprises an address indicator bit.

7. The system of claim 4, wherein said printer controller receives said data frame and identifies said transmission error detected by said first device controller by examining said predefined bit of said data frame.

8. The system of claim 7, wherein upon identification of said error, said printer controller sends a reset command to said optional support device.

9. The system of claim 1, wherein said error detection system comprises:
said first device controller, which sends to said printer controller a data signal; and
wherein said printer controller receives said data signal, generates an echo signal corresponding to and uniquely specifying said data signal and sends said echo signal to said first device controller, and
wherein said first device controller receives said echo signal and compares said echo signal with said data signal to detect said transmission error.

10. The system of claim 9, wherein said first device controller sets a predefined bit in a data frame to be transmitted to said printer controller upon detection of said transmission error.

11. The system of claim 10, wherein said printer controller receives said data frame and identifies said transmission error detected by said first device controller by examining said predefined bit of said data frame.

12. The system of claim 11, wherein upon identification of said error, said printer controller sends a reset command to said optional support device.

13. The system of claim 1, wherein said error detection system comprises:
said printer controller which sends to said first device controller a data signal; and
wherein said first device controller has stored in memory a predefined data, and receives said data signal and compares said data signal with said predefined data to detect said transmission error.

14. The system of claim 1, wherein said error detection system comprises:
said first device controller which sends to said printer controller a data signal; and
wherein said printer controller has stored in memory a predefined data, and receives said data signal and compares said data signal with said predefined data to detect said transmission error.

15. An error detection system for a printing system, comprising:
a printer having a printer controller;
an optional support device having a device controller; and
a communication link interconnecting said printer controller with said device controller;
said printer controller sending to said optional support device a data signal, and
said optional support device receiving said data signal, generating an echo signal corresponding to and uniquely specifying said data signal and sending said echo signal to said printer controller,
wherein said printer controller receives said echo signal and compares said echo signal with said data signal to identify a transmission error.

16. The system of claim 15, wherein upon identification of said transmission error, said printer controller transmits a reset command to said optional support device.

17. The system of claim 15, wherein said printer controller sets a predefined bit in a data frame to be transmitted to said optional support device if said transmission error is identified.

18. The system of claim 17, wherein said predefined bit comprises a ninth bit of a plurality of bits.

19. The system of claim 17, wherein said predefined bit comprises an address indicator bit.

20. The system of claim 17, wherein said optional support device receives said data frame and examines said predefined bit of said data frame.

21. The system of claim 20, wherein upon receiving said data frame, said optional support device resets itself to a known state if said predefined bit is set.

22. An error detection system for a printing system comprising:
a printer having a printer controller;
an optional support device having a device controller; and
a communications link interconnecting said printer controller with said device controller,
said optional support device sending to said printer controller a data signal, and
said printer controller receiving said data signal, generating an echo signal corresponding to and uniquely specifying said data signal and sending said echo signal to said optional support device,
wherein said optional support device receives said echo signal and compares said echo signal with said data signal to identify a transmission error.

23. The system of claim 22, wherein said optional support device informs said printer of an identification of said transmission error, and thereafter, said printer controller transmits a reset command to said optional support device.

24. The system of claim 22, wherein said optional support device sets a predefined bit in a data frame to be transmitted to said printer controller if said transmission error is identified.

25. The system of claim 24, wherein said predefined bit comprises a ninth bit of a plurality of bits.

26. The system of claim 24, wherein said predefined bit comprises an address indicator bit.

27. The system of claim 24, wherein said printer controller receives said data frame and examines said predefined bit of said data frame.

28. The system of claim 27, wherein if said predefined bit is set, said printer controller sends a reset command to said optional support device.

29. An error detection method for a printing system having a printer with a printer controller, an optional support device with a device controller and a communications link interconnecting said printer controller with said device controller, said error detection method comprising the steps of:
sending from said printer to said optional support device a data signal;
generating an echo signal corresponding to and uniquely specifying said data signal;
sending said echo signal to said printer controller; and
said printer receiving said echo signal and comparing said echo signal with said data signal to identify a transmission error.

30. The method of claim 29, wherein upon identification of said transmission error, further comprising the step of transmitting a reset command from said printer to said optional support device.

31. The method of claim 29, further comprising the step of setting a predefined bit in a data frame to be sent to said optional support device.

32. The method of claim 31, wherein said predefined bit comprises a ninth bit of said data frame.

33. The method of claim 31, further comprising the steps of said optional support device receiving said data frame and examining said data frame.

34. The method of claim 33, wherein said predefined bit, in conjunction with an information field of said data frame, serves as a link reset command for resetting said optional support device.

35. An error detection method for a printing system having a printer with a printer controller, an optional support device with a device controller and a communications link interconnecting said printer controller with said device controller, said error detection method comprising the steps of:

sending from said optional support device to said printer a data signal;

generating an echo signal corresponding to and uniquely specifying said data signal;

sending said echo signal to said optional support device; and said optional support device receiving said echo signal and comparing said echo signal with said data signal to identify a transmission error.

36. The method of claim 35, wherein upon identification of said transmission error, further comprising the step of transmitting a reset command from said printer to said optional support device.

37. The method of claim 35, further comprising the step of setting a predefined bit in a data frame to be sent to said printer.

38. The method of claim 37, wherein said predefined bit comprises a ninth bit of said data frame.

39. The method of claim 37, further comprising the steps of said printer controller receiving said data frame and detecting an error by examining said predefined bit of said data frame.

40. The method of claim 39, further comprising the step of sending a link reset command to reset said optional support device.

41. A print system comprising:

a printer including a printer controller;

a plurality of optional support devices associated with said printer, each of said plurality of optional support devices including a device controller; and a bi-directional serial communications path which provides serial electrical interconnection between said printer controller and each device controller of each of said plurality of optional support devices;

wherein said printer controller automatically assigns a unique device address to each of said plurality of optional support devices;

wherein each of said plurality of optional support devices farther includes logic circuitry which, based upon a command of said printer controller, enables passage of information generated by said printer controller through a first optional support device of said plurality of optional support devices to a next electrically serially connected optional support device following an assignment of a first device address to said first optional support device; and an error detection system for detecting a transmission error, said error detection system being associated with at least one of said printer controller and said plurality of optional support devices.

42. The system of claim 41, wherein said error detection system comprises:

said printer controller, which sends to said plurality of optional support devices a data signal; and wherein a designated optional support device generates an echo signal with an information field identical to an information field of said data signal and sends said echo signal to said printer controller, and wherein said printer controller receives said echo signal and compares said echo signal with said data signal to detect said transmission error.

43. The system of claim 42, wherein upon detection of said transmission error, said printer controller transmits a reset command to said plurality of optional support devices.

44. The system of claim 42, wherein said designated optional support device is one of a multiplicity of optional support devices on a serial communications trunkline, said serial communications trunkline consisting of at least a portion of said bi-directional serial communications path.

45. The system of claim 42, wherein said designated optional support device is selected by said printer controller.

46. The system of claim 42, wherein said printer controller sets a predefined bit in a data frame to be transmitted to said plurality of optional support devices upon detection of said transmission error.

47. The system of claim 41, wherein a designated optional support device of said plurality of optional support devices sets a predefined bit in a data frame to be transmitted to said printer controller upon detection of said transmission error.

48. The system of claim 47, wherein said predefined bit is an address indicator bit.

49. The system of claim 47, wherein said predefined bit is a ninth bit in said data frame.

50. The system of claim 47, wherein said printer controller receives said data frame and identifies said transmission error detected by said designated optional support device by examining said predefined bit.

51. The system of claim 50, wherein upon identification of said transmission error, said printer controller broadcasts a link reset command to each of said plurality of optional support devices.

52. The method of claim 29, wherein said comparing step includes a bit-by-bit comparison of an information field of said echo signal with an information field of said data signal.

* * * * *